March 20, 1956   C. B. DASCOMBE   2,738,752
TIRE PRESSURE INDICATOR
Filed May 18, 1953

Charles B. Dascombe
INVENTOR.

BY *Clarence A. O'Brien*
*and Harvey B. Jacobson*
Attorneys

United States Patent Office 2,738,752
Patented Mar. 20, 1956

2,738,752

TIRE PRESSURE INDICATOR

Charles B. Dascombe, Sparks, Nev.

Application May 18, 1953, Serial No. 355,715

2 Claims. (Cl. 116—34)

This invention relates generally to automobile accessories and pertains more particularly to an individual tire pressure indicator mechanism.

A primary object of this invention is to provide a simple yet effective tire pressure indicator which will take the place of a conventional valve stem cap.

Another object of this invention is to provide an improved form of tire pressure indicating mechanism which incorporates a novel anti-pilfering means therewith.

Another object of this invention is to provide an improved form of tire pressure indicator whose simple and effective construction lends itself readily to economical mass production.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
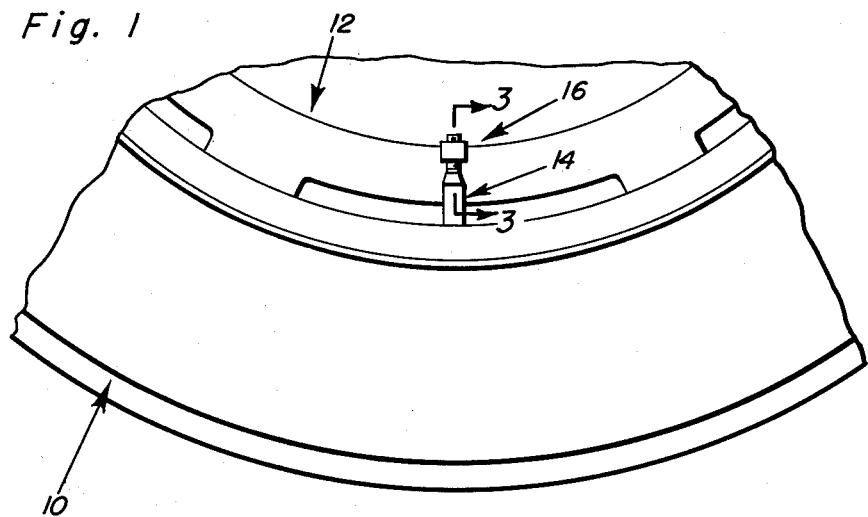
Figure 1 is an elevational view showing a portion of a tire and wheel assembly with the attachment in place.

Referring now more particularly to Figure 1, reference numeral 10 indicates generally the tire casing mounted on a wheel assembly indicated generally by the reference character 12 and the numeral 14 indicates a conventional valve stem associated with an inner tube disposed within the tire casing. The pressure within the inner tube normally maintains the casing in inflated relation so as to properly support the vehicle with which it is associated. Reference numeral 16 indicates generally the novel tire pressure indicating device which supplants the usual valve cap associated with the valve stem.

Figure 2:
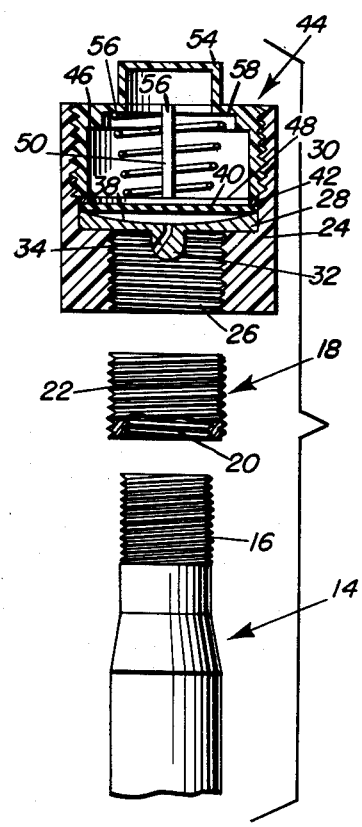
Figure 2 is an enlarged exploded view of the tire pressure indicating means and an associated valve stem.
Figure 3:
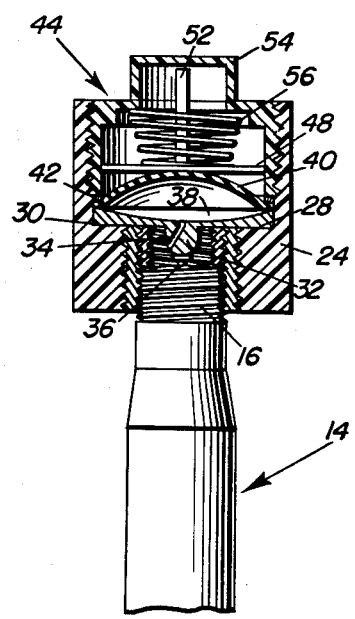
Figure 3 is a vertical section taken substantially along the plane of section line 3—3 of Figure 1, showing details of the construction on an enlarged scale.

Referring now more particularly to Figures 2 and 3, it will be seen that the valve stem 14 is provided at its upper end with the usual threaded portion 16 for threadedly receiving the conventional valve cap whereas in the construction shown this portion of the valve stem receives the threaded sleeve indicated generally by the reference character 18, which is internally threaded as indicated by the reference numeral 20 and is also externally threaded as at 22. The internal threads 20 are received on the threaded portion 16 of the valve stem and these internal threads are of slightly less diametral pitch than the associated threaded portion 16 of the valve stem so that this sleeve will bind on the valve stem for a purpose presently apparent. The body member 24 forming the main portion of the pressure indicator, is provided with an internally threaded recess 26 at its lower end, which recess is threadedly engaged on the outer threaded portion of the sleeve member when in the assembled position as shown more clearly in Figure 3. The upper portion of this body member is provided with an enlarged recess communicating with the lower recess so as to provide the shoulder 28 at the point of intersection of the two recesses, which shoulder engages against and supports a peripheral portion of the retaining member indicated generally by the reference character 30, which includes the depending projection or nipple 32 having the pressure communicating aperture 34 therein and as will be seen most clearly in Figure 3, this nipple is adapted to engage against the valve core 36 to depress the same and permit the air pressure within the inner tube to communicate with the upper dished surface 38 of the retaining member.

A resilient diaphragm 40 is seated on the retaining member 30 in the manner shown and the annular washer 42 seated against the upper surface of this diaphragm and urged into engagement therewith by the cap member 44 prevents air from leaking past this diaphragm, as will be apparent.

Cap member 44 is externally threaded and is engaged within the internally threaded upper recess and is provided with a smooth inter-cylindrical surface 46 within which the piston member 48 is reciprocal, such piston member carrying the centrally disposed plunger 50 in the manner shown.

The upper end portion 52 of the plunger may be brightly painted or otherwise made conspicuous so that when it projects within the transparent top portion 54 of the member 44 it may be readily seen, indicating that the pressure within the tire is normal. A coil spring 56 is disposed concentrically of the plunger and seats at its lower end against the upper face of the piston number 48 and seats at its upper end against the shoulder portion 58 of the member 44.

In operation, it will be readily apparent that the projection 32 engages against the valve core member 36 and depresses the same to allow air to escape from the inner tube to act against the diaphragm member 40 urging the same to a position such as that shown in Figure 3 wherein the piston member 48 and its associated plunger is urged under pressure so that the upper portion of the latter is projected within the transparent portion 54 of the plug member 44. The spring 56 may, of course, be varied as to tension dependent upon the normal pressure which is desired to be maintained in the tire but in any case it is desired that the tension of this spring be such that with the tire assembly inflated to its normal pressure, the upper portion of the plunger will be projected to the position shown in Figure 3, any other position of the plunger indicating that the pressure within the tire is not proper.

The upper surface of the retaining member 30 is dished as previously described so that the main portion of the diaphragm 40 will not normally come into contact therewith, thus obviating the tendency of the diaphragm to stick or adhere to the surface of this retaining member, and prevent proper operation of the device.

As previously mentioned, there is a slight interference between the threaded sleeve 18 and the upper portion of the valve stem so that the sleeve is more or less permanently attached to the same. This will tend to discourage pilfering inasmuch as the sleeve member will remain on the valve stem when the cap member is removed, and the cap member, being of larger internal diameter in its recessed portion 26 than conventional valve stems, will not be able to be used on other valve stems without the use of the threaded sleeve member 18. In other words, this assmbly will work only in its proper environment with the sleeve member 18. The fit between the threaded sleeve 18 and the upper portion 16 of the valve stem is such that to effect the removal of the former, it would be necessary to exert such a pressure on the sleeve member that its externally threaded portion would be damaged or marred to such an extent as to render this sleeve member useless. Therefore, it will be readily seen that the design of the entire assembly tends to obviate tampering or pilfering of this device.

The particular construction of the various component parts of the assembly, that is, the material of which they are made, is immaterial, it being necessary only that the portion 54 of the assembly be transparent so that the plunger may be readily and easily seen.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A tire gauge comprising a body member having upper and lower ends, said lower end being recessed to receive the free end of a tire valve, the upper end of said body member being provided with an enlarged recess communicating with the lower recess and forming therewith an annular shoulder in said member, a rigid abutment member seated on said annular shoulder within said enlarged recess and including a concave upper surface and a bulbous portion projecting into said lower recess to engage and depress a valve core in a tire valve to open a tire valve, a flexible diaphragm resting upon said rigid abutment member and confined in said enlarged recess and prevented from sticking to said rigid abutment member by said concave upper surface, said bulbous portion and rigid abutment member having a bore therethrough for admitting air pressure from an open tire valve to said diaphragm to flex said diaphragm upwardly, a plunger in said enlarged recess resting on said diaphragm for upward projection by upward flexing of said diaphragm, and a retaining member threaded into the upper end of said body member in engagement with peripheral portions of said diaphragm, said retaining member having a transparent top portion into which said plunger projects to give a visual indication of pressure in a tire having an open valve received in said lower end of said body member.

2. In combination with an externally threaded valve stem, a sleeve, said sleeve being provided with internal thread and external threads, the diameter of said internal threads being slightly less diametrical pitch than the diameter of the external threads on said valve stem to lock said sleeve on said stem against removal therefrom, a tire pressure indicating cap having an internally threaded end portion received on said sleeve, the mating threaded surfaces of said cap and sleeve being of the same diameter for removal of said cap from said locked sleeve.

References Cited in the file of this patent

UNITED STATES PATENTS

| | | |
|---|---|---|
| 1,289,712 | Evans | Dec. 31, 1918 |
| 1,368,927 | Harris | Feb. 15, 1921 |
| 1,731,632 | Main | Oct. 15, 1929 |
| 2,037,968 | Duty | Apr. 21, 1936 |
| 2,225,675 | West | Dec. 24, 1940 |
| 2,479,915 | Eastman | Aug. 23, 1949 |
| 2,579,120 | Mercer | Dec. 18, 1951 |
| 2,651,279 | Laurie | Sept. 8, 1953 |